US010736040B1

(12) United States Patent
Chen

(10) Patent No.: US 10,736,040 B1
(45) Date of Patent: Aug. 4, 2020

(54) SYSTEM SELECTION IN MARGINAL COVERAGE AREA

(71) Applicant: MOTOROLA MOBILITY LLC, Chicago, IL (US)

(72) Inventor: Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/431,378

(22) Filed: Jun. 4, 2019

(51) Int. Cl.
*H04W 52/02* (2009.01)
*H04W 72/04* (2009.01)
*H04W 76/18* (2018.01)
*H04W 24/10* (2009.01)
*H04W 76/15* (2018.01)

(52) U.S. Cl.
CPC ....... *H04W 52/0241* (2013.01); *H04W 24/10* (2013.01); *H04W 52/0264* (2013.01); *H04W 72/042* (2013.01); *H04W 76/15* (2018.02); *H04W 76/18* (2018.02)

(58) Field of Classification Search
CPC ......... H04W 52/0209; H04W 52/0241; H04W 52/0245; H04W 52/0251; H04W 52/0258; H04W 52/0264; H04W 76/15; H04W 76/16; H04W 76/18; H04W 72/0406; H04W 72/0413; H04W 72/042; H04W 24/10
See application file for complete search history.

(56) References Cited

U.S. PATENT DOCUMENTS

| 7,881,722 | B2* | 2/2011 | Gunnarsson | H04W 72/0486 |
| | | | | 455/435.2 |
| 9,301,200 | B1* | 3/2016 | Vivanco | H04W 28/08 |
| 10,548,056 | B1* | 1/2020 | Sung | H04W 36/0069 |
| 2010/0035610 | A1* | 2/2010 | Narang | H04W 36/0088 |
| | | | | 455/434 |
| 2012/0039167 | A1* | 2/2012 | Swaminathan | H04W 76/16 |
| | | | | 370/225 |
| 2012/0202480 | A1* | 8/2012 | Franklin | H04W 36/0083 |
| | | | | 455/423 |
| 2014/0213256 | A1* | 7/2014 | Meylan | H04W 48/18 |
| | | | | 455/436 |
| 2015/0334584 | A1* | 11/2015 | Sun | H04W 24/02 |
| | | | | 466/67.11 |

(Continued)

*Primary Examiner* — Kevin D Mew
(74) *Attorney, Agent, or Firm* — Yudell Isidore PLLC

(57) ABSTRACT

A communication device mitigates power consumption and communication connectivity lapses in a marginal coverage area with unsatisfactory transmit communication quality and satisfactory receive communication quality of respective uplink and downlinks with a radio access network (RAN) using a first radio access technology (RAT). Based on information of past communication success and failure, a controller of the communication device determines whether communication services can be successfully obtained from the RAN using a second RAT. In response to determining that communication services cannot be successfully obtained using the second RAT, the communication device monitors the downlink with the first RAN using the first RAT to receive any mobile terminated calls. In addition, the communication delays, for a preset period of time, any attempt to establish uplink communication using one of the first and second RATs that are expected to be unsuccessful in the marginal coverage area.

18 Claims, 7 Drawing Sheets

(56) References Cited

U.S. PATENT DOCUMENTS

| | | | |
|---|---|---|---|
| 2016/0066217 A1* | 3/2016 | Krishnamoorthy | H04W 36/14 455/436 |
| 2016/0073305 A1* | 3/2016 | Yang | H04W 36/30 455/436 |
| 2016/0073331 A1* | 3/2016 | Balakrishnan | H04L 12/6418 455/456.1 |
| 2016/0128004 A1* | 5/2016 | Lee | H04W 52/146 370/311 |
| 2017/0111931 A1* | 4/2017 | Damnjanovic | H04W 74/0825 |
| 2018/0227902 A1* | 8/2018 | Gholmieh | H04W 72/048 |
| 2018/0331798 A1* | 11/2018 | Nammi | H04W 52/143 |
| 2018/0343593 A1* | 11/2018 | Singh | H04W 48/18 |
| 2019/0124543 A1* | 4/2019 | Grayson | H04W 28/0268 |
| 2019/0364464 A1* | 11/2019 | Shaikh | H04L 12/1407 |
| 2020/0068638 A1* | 2/2020 | Au | H04L 43/16 |

\* cited by examiner

SYSTEM SELECTION IN MARGINAL COVERAGE AREA

BACKGROUND

1. Technical Field

The present disclosure relates generally to communication devices and in particular to communication devices that are capable of selecting and communicating with radio access networks (RANs) using more than one type of radio access technology (RAT).

2. Description of the Related Art

Mobile communications has rapidly evolved with successful generations of radio access technologies (RATs) being deployed that generally increase the communication capability and geographic reach of a communication network. Nodes of a radio access network (RAN) are added to the communication network for additional geographic and functional capacity. These nodes generally include newer RATs as well as older RATs to support older mobile communication devices. Newer mobile devices generally include support for both newer and older generations of RAT so that successful connection can be made to various older and newer nodes within communication range of the mobile communication device.

Generally-known communication devices prioritize connections to nodes that support the most capable RAT. The node also needs to be close enough to the communication device to enable sufficiently strong signal strength on both an uplink and a downlink for successful connection. A default prioritization of the mobile communication device is thus to attempt to camp on and communicate with an in-range node of the latest generation of RAT supported by the communication device. If such a node is not available, then the mobile communication device searches for an in-range node with a less-capable generation of RAT. This conventional approach is satisfactory in many situations. However, a mobile communication device can be positioned in a marginal coverage area with only a currently selected RAN being possibly within range for communication services using either a first or second RAT. Instances can occur when the mobile communication device will encounter problems only on an uplink with the currently selected RAN using the first RAT. After dropping registration with the currently selected RAN, the mobile communication device can be unable to reconnect with the same RAN for communication services using the second RAT. The mobile communication device may consume an excessive amount of power and possibly miss mobile terminated (MT) communication calls in an unsuccessful attempt to connect via a less capable RAT.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
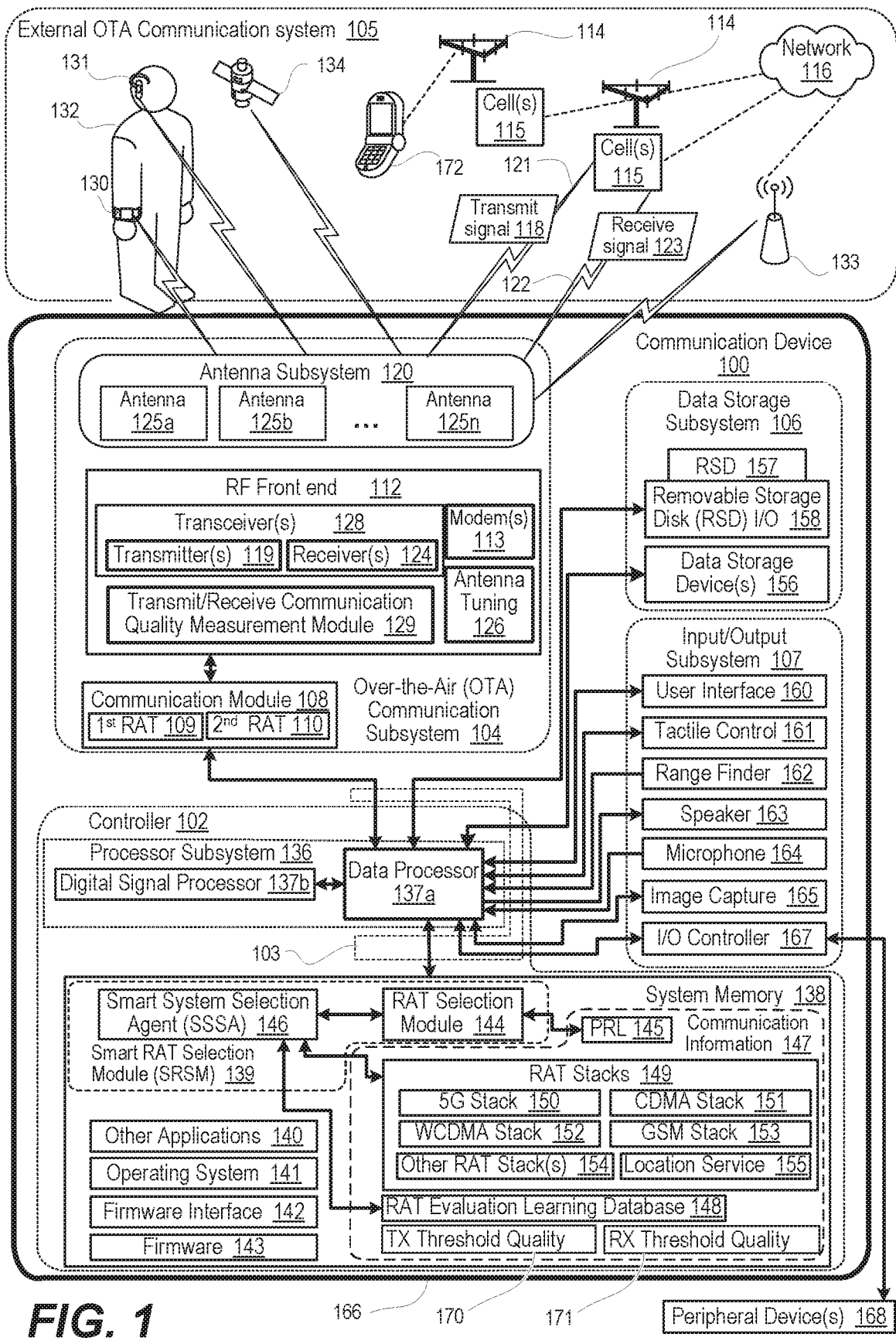
FIG. 1 is a functional block diagram illustrating a mobile communication device that mitigates power consumption and communication connectivity lapses in a marginal coverage area, according to one or more embodiments.

According to aspects of the present innovation, a communication device, a method, and a computer program product provide for smart radio access technology (RAT) system selection that mitigates power consumption and communication connectivity lapses in a marginal coverage area. Based on prior learning of communication connection successes and failures with a radio access network (RAN) using more than one RAT, the communication device determines when it is better to delay attempting to reconnect using another RAT. During the delay, some communication capabilities can be maintained, and unnecessary power consumption is avoided by not attempting to reconnect when deemed unlikely to succeed. In one or more embodiments, a radio frequency (RF) front end of the communication device transmits an uplink and receives a downlink in a selected one of: (i) a first RAT; and (ii) a second RAT. A memory of the communication device contains: (i) a smart RAT selection module (SRSM) that mitigates power consumption and communication connectivity lapses in a marginal coverage area; and (ii) communication information of past communication successes and failures with at least a first RAN using the first and second RATs. A controller is communicatively coupled to the RF front end and the memory. The controller executes the SRSM to enable the communication device to perform functionality described according to aspects of the present disclosure. The functionality includes determining whether two conditions exist for the marginal coverage area. The first condition is whether transmit communication quality of a first uplink with the RAN using the first RAT fails to satisfy a first transmit threshold quality for remaining registered with the first RAN to complete uplink communication services. The second condition is whether receive communication quality of a first downlink with the first RAN using the first RAT satisfies a first receive threshold quality for remaining registered with the first RAN to complete downlink communication services. In response to both criteria being met, the functionality includes determining, while being registered to the first RAN and based on the communication information, whether communication services can be successfully obtained using the second RAT. In response to determining that communication services cannot be successfully obtained using the second RAT, the communication device monitors the first downlink with the first RAN using the first RAT to receive any mobile terminated (MT) calls.

Thus, although the communication device cannot initiate a mobile originated (MO) call due to the unsatisfactory communication quality of the uplink, some communication capabilities are maintained as a result of the device remaining registered with the first RAN using the first RAT. In addition, the communication device delays, for a preset period of time, any attempt to establish uplink communication using either one of the first and second RATs, which are both expected to be unsuccessful in the marginal coverage area. By not attempting to establish uplink communication, the rate of power consumption by the communication device is reduced as compared to if attempts had been made.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 is a functional block diagram illustrating example mobile communication device 100 that mitigates power consumption and communication connectivity lapses in a marginal coverage area. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. These various devices all provide and/or include the necessary hardware and software to support the various wireless or wired communication functions as part of a communication system. Communication device 100 can also be an over-the-air link in a communication system. Communication device 100 can be intended to be portable, hand-held, wearable, detachable, positioned in a fixed location, or mounted to a movable vehicle. Examples of such over-the-air link communication devices 100 include a wireless modem, an access point, a repeater, a wirelessly-enabled kiosk or appliance, a femto-cell, a small coverage area node, and a wireless sensor, etc. Communication device 100 can have computing functionality directed to local functionality without wide area communication capabilities.

Communication device 100 includes controller 102 that controls functions and/or operations of communication device 100. These functions and/or operations include, but are not limited to including, application data processing and signal processing. Communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Controller 102 is communicatively coupled via system interlink 103 to over-the-air (OTA) communication subsystem 104 that communicates with external OTA communication system 105. Controller 102 is also communicatively coupled via system interlink 103 to data storage subsystem 106, and input/output (I/O) subsystem 107. Although certain direct interconnections (system interlink 103) are illustrated in FIG. 1, it is to be understood that more, fewer, or different interconnections may be present in other embodiments.

Referring now to the specific component makeup and the associated functionality of the presented components, OTA communication subsystem 104 communicates with selected radio access network (RAN) 114 having respective nodes, base stations (BSs) or cells 115. RANs 114 are a part of a wireless wide area network (WWAN) that is connected to wide area network 116 and provides data and voice services. OTA communication subsystem 104 includes communication module 108 that operates in baseband to encode data for transmission and decodes received data. Communication module 108 uses a selected one of more than one predetermined communication protocol, such as first and second RATs respectively defined in first and second RAT modules 109, 110. OTA communication subsystem 104 includes radio frequency (RF) front end 112 having one or more modem(s) 113. Modem(s) 113 modulate baseband encoded data from communication module 108 onto a carrier signal to provide transmit signal 118. Transmitter(s) 119 amplify transmit signal 118 for transmission by antenna subsystem 120 as uplink 121 to cell 115 of RAN 114. Antenna subsystem 120 receives downlink 122 that carries receive signal 123 from cell 115 of RAN 114. Receiver(s) 124 amplifies and filters receive signal 123. Modem(s) 113 demodulate receive signal 123, resulting in demodulated received baseband data.

In one or more embodiments, antenna subsystem 120 includes multiple antenna elements 125a-n that are individually tuned to selected RF bands to support different RF communication bands and protocols. Antenna elements 125a-n can be used in combination for multiple input multiple output (MIMO) operation for beam steering and spatial diversity. Antenna tuning circuitry 126 adjusts an antenna impedance of antenna subsystem 120. Antenna tuning circuitry 126 improves an antenna efficiency at desired transmit or receive frequencies of transmitter(s) 119 and receiver(s) 124, respectively, within transceiver(s) 128, which includes transmitter(s) 119 and receiver(s) 124. In one or more embodiments, communication device 100 is proximate to, or on, a body generating a lossy dielectric effect for electronic device 100. Antenna tuning circuitry 126 is electrically coupled to antenna subsystem 120 to compensate for a lossy dielectric effect. Communication quality measurement module 129 measures transmit and receive power levels and error rates to enable controller 102 to make selection and reselection decisions for communication services.

The techniques described herein may be used for various wireless communication networks that operate according to, but not limited to, any one or more of the OMA (Open Mobile Alliance), 3GPP (3rd Generation Partnership Project), 3GPP2 (3rd Generation Partnership Project 2), IEEE (Institute of Electrical and Electronics Engineers) 802.xx, and WiMAX Forum standards. The terms "networks" and "systems" are often used interchangeably. Such communication networks can be Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement a radio technology such as Universal Terrestrial Radio Access (UTRA), CDMA 2000, etc. UTRA includes Wideband-CDMA (W-CDMA) and time division synchronous code division multiple access (TD-SCDMA). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from the 3GPP organization. CDMA2000 is described in documents from the 3GPP2 organization. These various radio technologies and standards are known in the art. Aspects of the present innovation can further be implemented with 5G (short for 5th Generation), which is a commonly used term for certain advanced wireless systems. Industry association 3GPP defines any system using "5G NR" (5G New Radio) software as "5G", a definition that came into general use by late 2018. Others may reserve the term for systems that meet the requirements of the ITU IMT-2020, which represents more nations. 3GPP will submit their 5G NR to the ITU. 5G follows 2G, 3G and 4G and their respective associated technologies (such as GSM, UMTS, LTE, LTE Advanced Pro, etc.).

In one or more embodiments, controller 102, via OTA communication subsystem 104, performs other types of OTA communication with external OTA communication system 105. OTA communication subsystem 104 can communicate with one or more personal access network (PAN) devices within external OTA communication system 105, such as smart watch 130 or wireless headset 131 worn by person 132 and that is reached via Bluetooth connection. In one or more embodiments, OTA communication subsystem 104 communicates with one or more locally networked devices via a wireless local area network (WLAN) link provided by WLAN node 133. WLAN node 133 is in turn connected to wide area network 116, such as the Internet. In one or more embodiments, OTA communication subsystem 104 communicates with global positioning system (GPS) satellites 134 to obtain geospatial location information.

Controller 102 includes processor subsystem 136, which executes program code to provide functionality of the electronic device 100. Processor subsystem 136 includes one or more central processing units (CPUs) ("data processor") 137a. In one or more embodiments, processing subsystem 136 includes a digital signal processor (DSP) 137b. Controller 102 includes system memory 138, which contains actively used program code and data. In one or more embodiments, system memory 138 includes therein a plurality of such program code and modules, including applications such as smart RAT selection module (SRSM) 139 and other applications such as a communication application 140. System memory 138 can also include operating system (OS) 141, firmware interface 142 such as basic input/output system (BIOS) or Uniform Extensible Firmware Interface (UEFI), and platform firmware 143. These software and/or firmware modules have varying functionality when their corresponding program code is executed by processor subsystem 136 or secondary processing devices within communication device 100.

System memory 138 contains applications and computer data that support communications using a selected RAT with selected RAN 114. In one or more embodiments, SRSM 139 includes RAT selection module (RSM) 144 that makes selection and reselection decisions for communication services for a selected RAN 114 based on priority roaming list (PRL) 145. When a marginal coverage area is detected by RSM 144, RSM 144 triggers smart system selection agent (SSSA) 146 of SRSM to decide, based on communication information 147 that indicates whether seeking communication services using another RAT is likely to succeed with selected RAN 114. In one or more embodiments, communication information 147 includes RAT evaluation learning database 148 that is maintained by SSSA 146. Depending on what RAT is selected, one or more RAT stacks 149, such as 5G stack 150, CDMA stack 151, WCDMA stack 152, GSM stack 153, and other RAT stack(s) 154 are maintained/stored within system memory 138. Communication from GPS satellites 134 is supported by location service stack 155 stored within system memory 138.

Data storage subsystem 106 provides nonvolatile storage accessible to controller 102. For example, data storage subsystem 106 can provide a large selection of other applications that can be loaded into system memory 138. In one or more embodiments, local data storage device(s) 156 includes hard disk drives (HDDs), optical disk drives, solid state drives (SSDs), etc. In one or more embodiments, removable storage device (RSD) 157 that is received in RSD interface 158 is a computer program product or computer readable storage device, which can be referred to as non-transitory. RSD 157 can be accessed by controller 102 to provision communication device 100 with program code. When executed by controller 102, the program code provides the functionality to communication device 100 to perform aspects of the present innovation described herein.

I/O subsystem 107 includes input and output devices. For example, user interface device 160 presents visual or tactile outputs as well as receive user inputs. Tactile/haptic control 161 provides an interface such as for braille reading or manual inputs. Range finder 162 emits a waveform of energy, such as acoustic, infrared, radio frequency (RF), etc., whose time of flight is used to measure distance to a reflecting object. Audio speaker 163 provides audio output, including audio playback and alerts. Microphone 164 receives user audible inputs. Image capturing device 165, such as a camera, can receive gestures and other image data. I/O subsystem 107 can be wholly or substantially encompassed by device housing 166. In one or more embodiments, I/O controller 167 connects to one or more peripheral devices 168 that can include additional I/O functionality. I/O controller 167 can also interface to a wired local access network (LAN) (not shown).

In one or more embodiments, RF front end 112 of communication device 100 transmits uplink 121 and receives downlink 122 in a selected one of: (i) first RAT; and (ii) second RAT. Memory contains SRSM 139 and contains communication information 147 of past communication success and failure with at least a first RAN 114 using the first and second RATs. Controller 102 is communicatively coupled to RF front end 112 and system memory 138. Controller 102 executes SRSM 139 to enable communication device 100 to mitigate power consumption and communication connectivity lapses in a marginal coverage area. The mitigation is applicable when two conditions are both present: (i) transmit communication quality of first uplink 121 with first RAN 114 using the first RAT fails to satisfy first transmit ("TX") threshold quality 170 for remaining registered with first RAN 114 to complete uplink communication services; and (ii) receive communication quality of first downlink 122 with first RAN 114 using the first RAT satisfies first receive ("RX") threshold quality 171 contained in memory 138 for remaining registered with first RAN 114 to complete downlink communication services. In response determining that both conditions are present, controller 102 determines, while being registered to the first RAN and based on the communication information, whether communication services can be successfully obtained using the second RAT. In response to determining that communication services cannot be successfully obtained using the second RAT, controller 102 monitors the first downlink with the first RAN using the first RAT to receive any mobile terminated (MT) calls. In addition, controller 102 delays, for a preset period of time, any attempt to establish uplink communication using either one of the first and second RATs, which are both expected to be unsuccessful in the marginal coverage area.

For clarity, communication device 100 can learn successes and failure in connecting with a particular RAN that are later used by the same communication device 100 for smart system selection. In one or more embodiments, other communication devices 172 share communication information with communication device 100. Communication device 100 can encounter a particular RAN or node for the first time yet benefit from communication information accumulated by other communication devices 172 for smart RAT system selection. Contextual information associated with the successes and failures can be used by each communication device (100, 172) to filter the communication information from other communication devices (100, 172). For example, communication device 100 can use only communication information provided by other communication devices that are of the same manufacturer and model.

Figure 2:
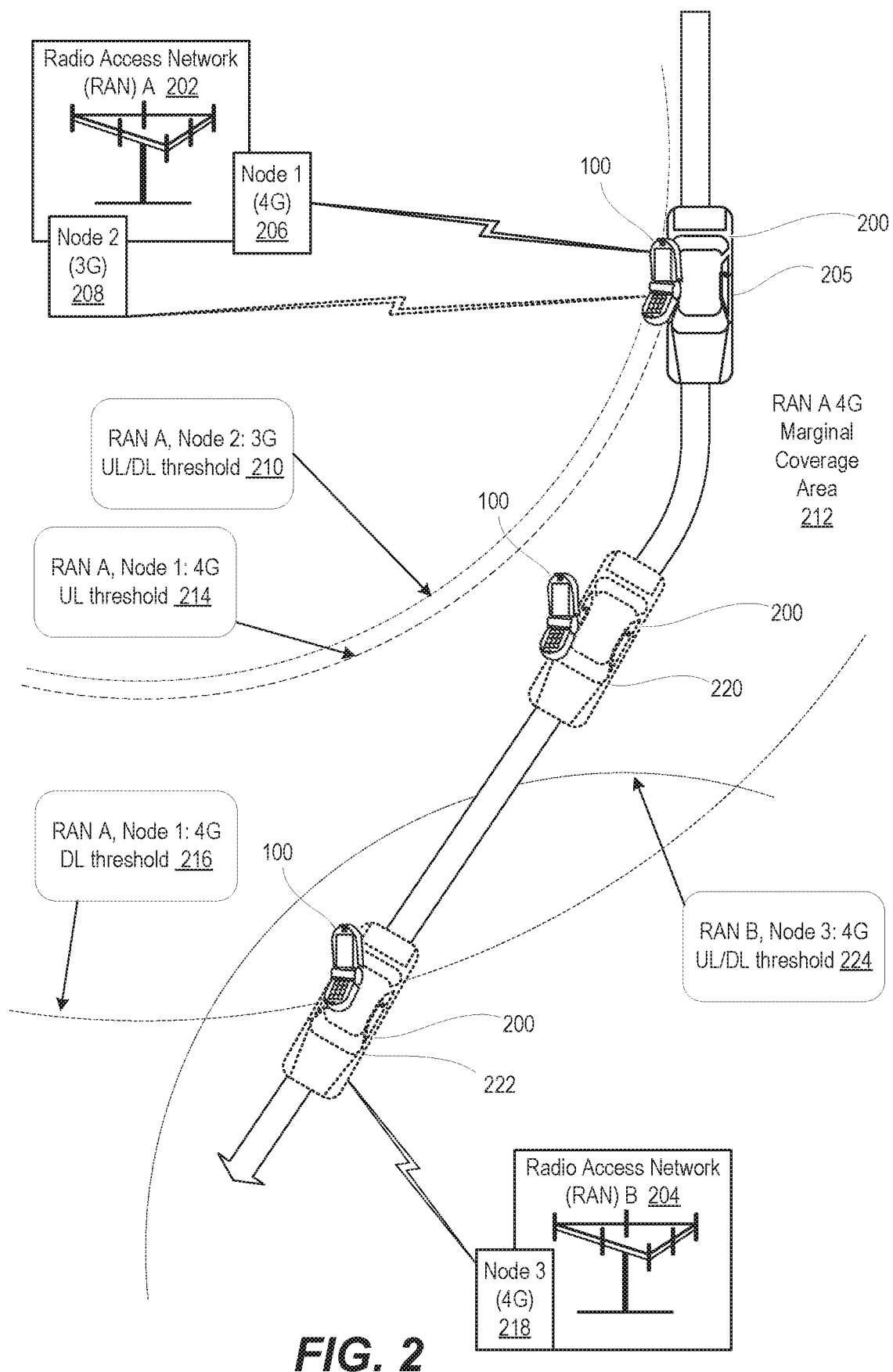
FIG. 2 is a top view diagram of a time-sequenced scenario of a mobile communication device carried in a vehicle passing through a marginal coverage area, according to one or more embodiments.

FIG. 2 is a top view diagram of a time-sequenced scenario of vehicle 200 moving with communication device 100 from a WWAN coverage area for RAN "A" 202 to a WWAN coverage area for RAN "B" 204. At an initial time and while at a first location 205, communication device 100 is registered to node "1" 206 of RAN "A" 202 for 4G communication services. Communication device 100 is aware of, but is not registered to, node "2" 208 of RAN "A" 202 that provides communication services using a second RAT, such as 3G. Although not actively using 3G RAT, communication device 100 has learned, or has received a result of a learning performed via another device, based on prior communication successes and failures, that the first location 205 is outside of coverage area for 3G communication services by node "2" 208. This determination can be based on being outside of a threshold distance 210 for satisfactory RAN "A" 3G Uplink (UL)/Downlink (DL) communication quality. Based on actual measurements or failure to successfully request uplink communication services, at first location 205, communication device 100 is in a marginal coverage area 212 for 4G communication services by node "1" 206. First location 205 is outside of a threshold distance 214 for successful 4G UL communication services but within a threshold distance 216 for successful 4G DL communication services with node "1" 206. Based on the learning of past successes and failures or actual measurements, communication device 100 also predicts that first location 205 is outside of the next closest coverage area provided by RAN "B" 204. Node "3" 218 of RAN "B" 204 also supports 4G RAT.

Based on the learning of past successes and failures, communication device 100 at an intermediate time and while in second location 220 delays seeking communication services from node "2" 208 of RAN A 202 or node "3" 218 of RAN B 204, predicting that such attempts would be futile. By delaying such an attempt, communication device 100 remains registered to node "1" 206 of RAN "A" 202 to at least be aware of when a mobile terminated (MT) call is occurring. Also, by not attempting uplink transmission that would not result in uplink communication services from RAN "A" 202, communication device 100 avoids unnecessary power consumption.

At a third time and at a final location 222, communication device 100 is leaving marginal coverage area 212 for RAN "A" 202 and is within coverage area for RAN "B" 204, defined by distance threshold 224. With the delay having expired, communication device 100 selects node "3" 218 of RAN B 204 for 4G uplink and downlink communication services.

Figure 3A:
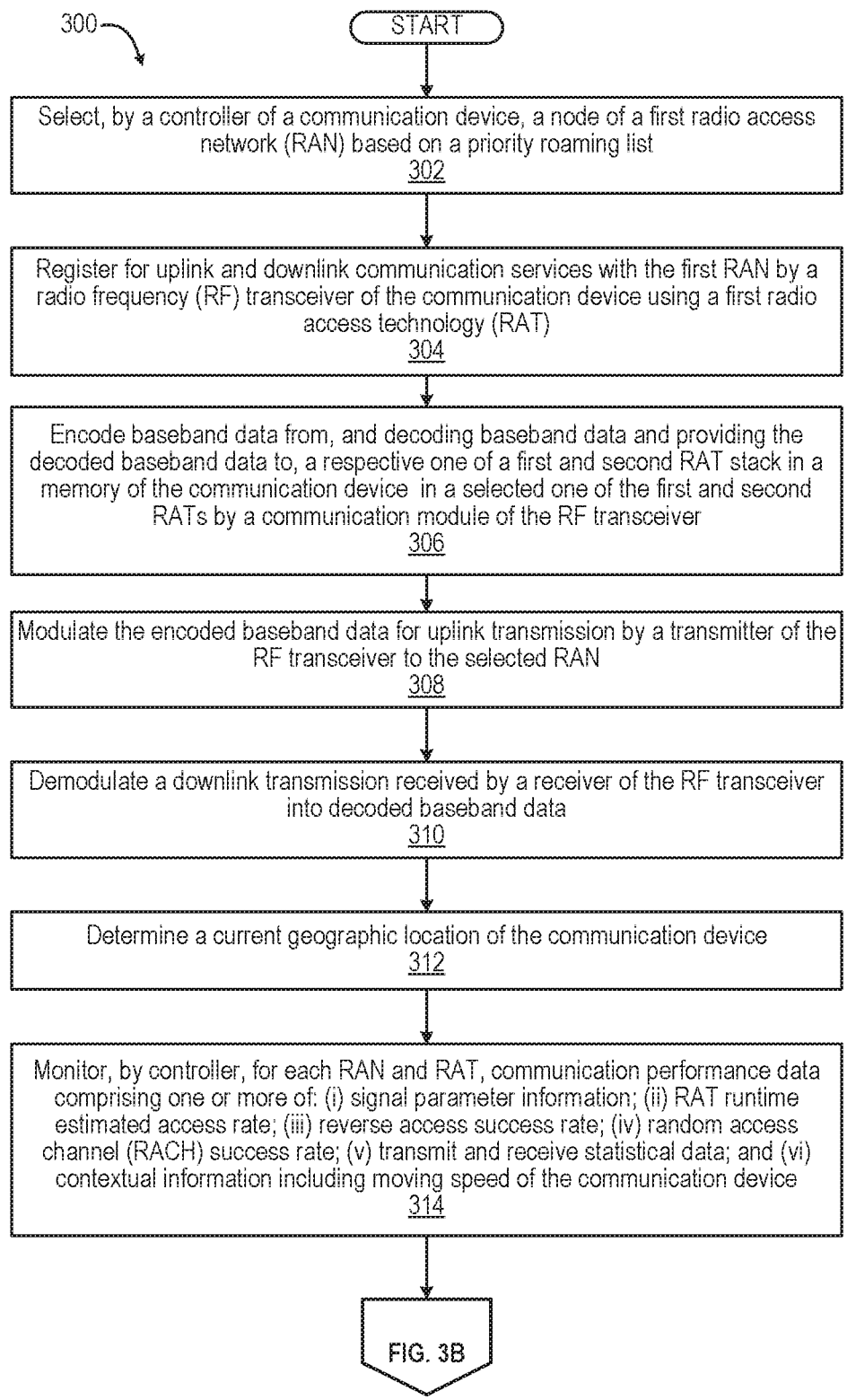
FIGS. 3A-3B depict a flow diagram of a method for learning by the communication device of the likelihood of obtaining communication services from a particular radio access network (RAN) in a marginal coverage area based on past successes and failures, according to one or more embodiments.
Figure 3B:
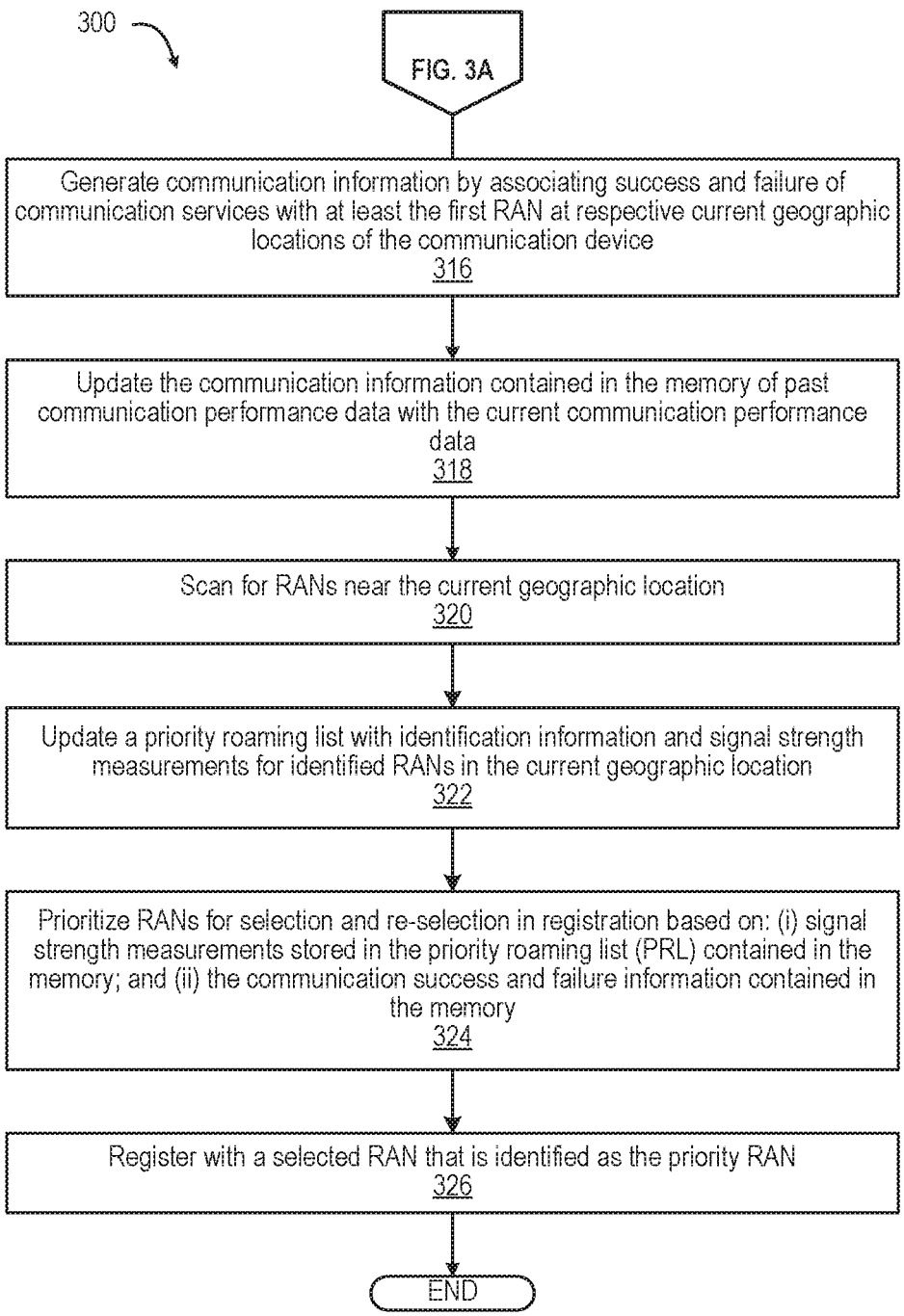

FIGS. 3A-3B depicts method 300 for learning by communication device 100 (FIG. 1) of the likelihood of obtaining communication services from a particular RAN in a marginal coverage area based on past successes and failures. With initial reference to FIG. 3A, method 300 includes selecting, by controller 102 (FIG. 1), a node of a first RAN based on a priority roaming list 145 maintained in memory 138 (FIG. 1) (block 302). Method 300 includes registering for uplink and downlink communication services with the first RAN by RF transceiver(s) 128 (FIG. 1) of communication device 100 (FIG. 1) using first RAT (block 304). In one or more embodiments, first RAT is a later developed RAT with more capability than an earlier generation second RAT. Method 300 includes encoding baseband data from, and decoding baseband data and providing the decoded baseband data to, a respective one of a first and second RAT stack in memory 138 (FIG. 1) of communication device 100 (FIG. 1). Each of the first and second RAT stacks supports a corresponding one of the first and second RATs used by communication application 140 and communication module 108 (FIG. 1) of the RF transceiver (block 306). Method 300 includes modulating the encoded baseband data for uplink transmission by a transmitter of the RF transceiver to the selected RAN (block 308). Method 300 includes demodulating a downlink transmission received by a receiver of the RF transceiver into decoded baseband data (block 310).

Method 300 includes determining a current geographic location of the communication device (block 312). Method 300 includes monitoring, by controller, for each RAN and RAT, communication performance data comprising one or more of: (i) signal parameter information; (ii) RAT runtime estimated access rate; (iii) reverse access success rate; (iv) random access channel (RACH) success rate; (v) transmit and receive statistical data; and (vi) contextual information, including moving speed of the communication device (block 314). Continuing in FIG. 3B, method 300 includes generating communication information by associating success and failure of communication services with at least the first RAN at respective current geographic locations of the communication device (block 316). Method 300 includes updating the communication information contained in the memory of past communication performance data with the current communication performance data (block 318). In one or more embodiments, method 300 includes scanning for RANs near the current geographic location (block 320). Method 300 includes updating a priority roaming list with identification information and signal strength measurements for identified RANs in the current geographic location (block 322). Method 300 includes prioritizing RANs for selection and re-selection in registration, based on: (i) signal strength measurements stored in the priority roaming list (PRL) contained in the memory; and (ii) the communication of success and failure information contained in the memory (block 324). Method 300 includes registering with a selected RAN that is identified as the priority RAN (block 326). Then method 300 ends.

Figure 4A:
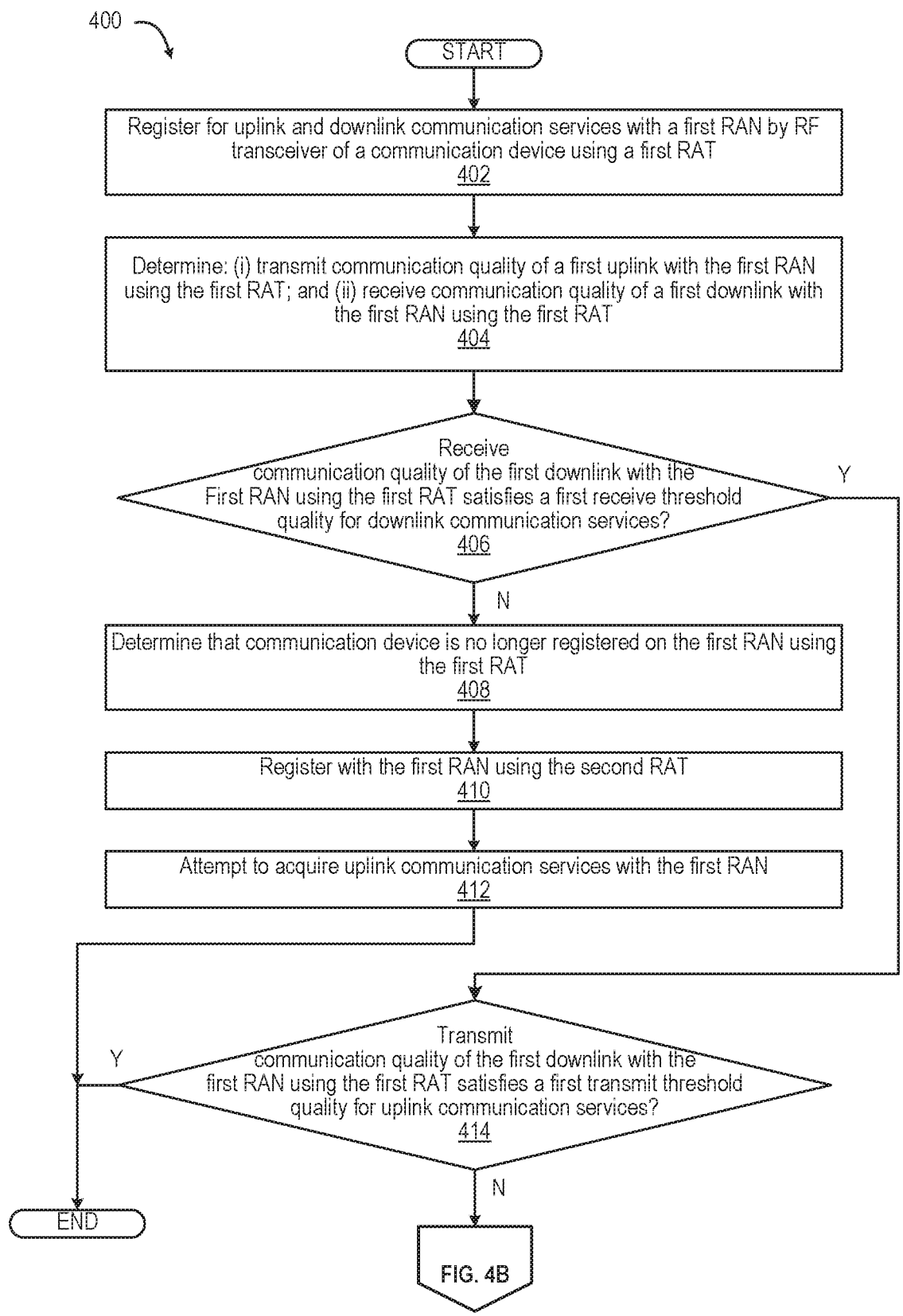
FIGS. 4A-4C depict a flow diagram of a method for smart system selection to maintain certain downlink communication services and to minimize power consumption by delaying attempts to connect to uplink communication services in a marginal coverage area, according to one or more embodiments.
Figure 4B:
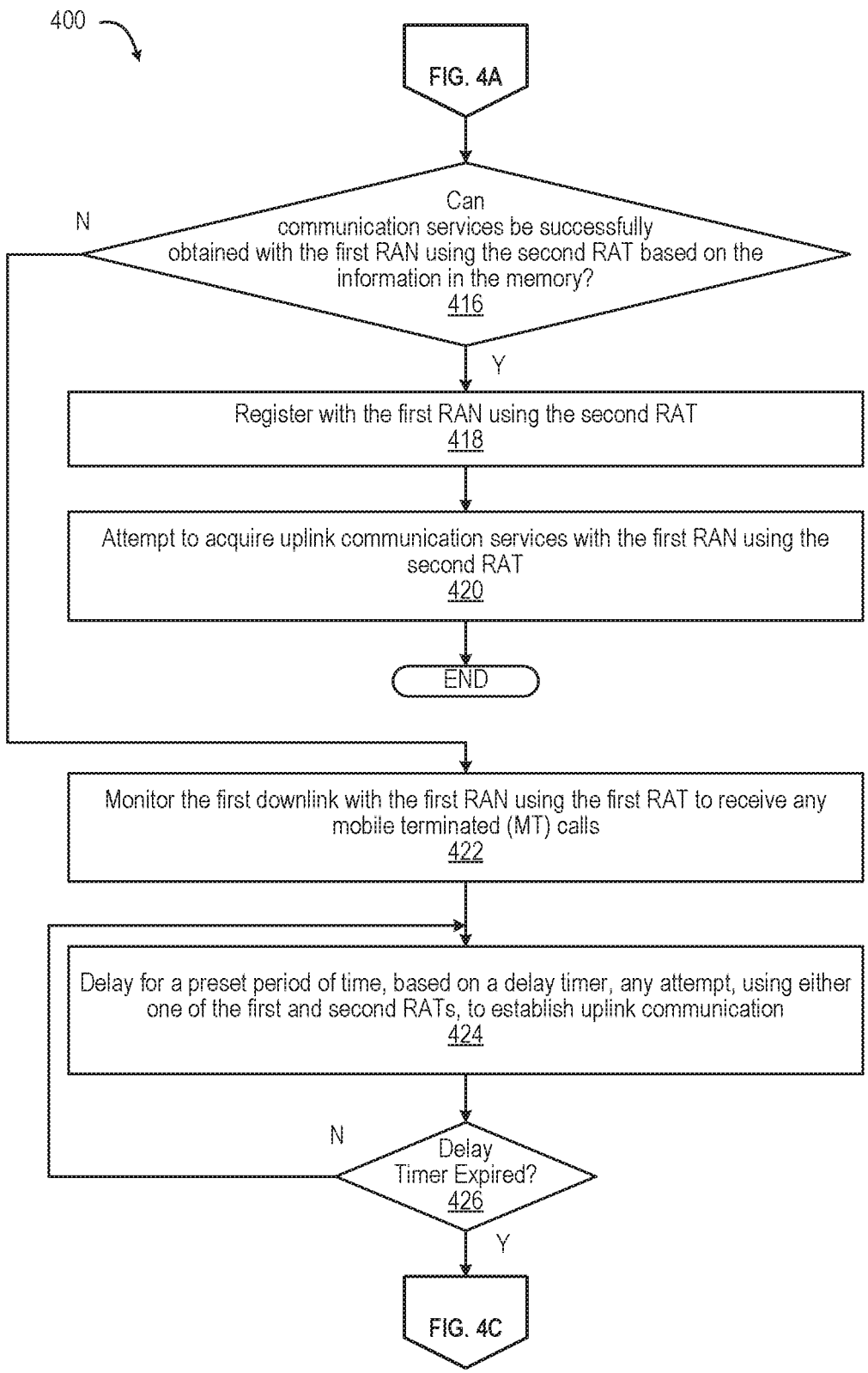
Figure 4C:
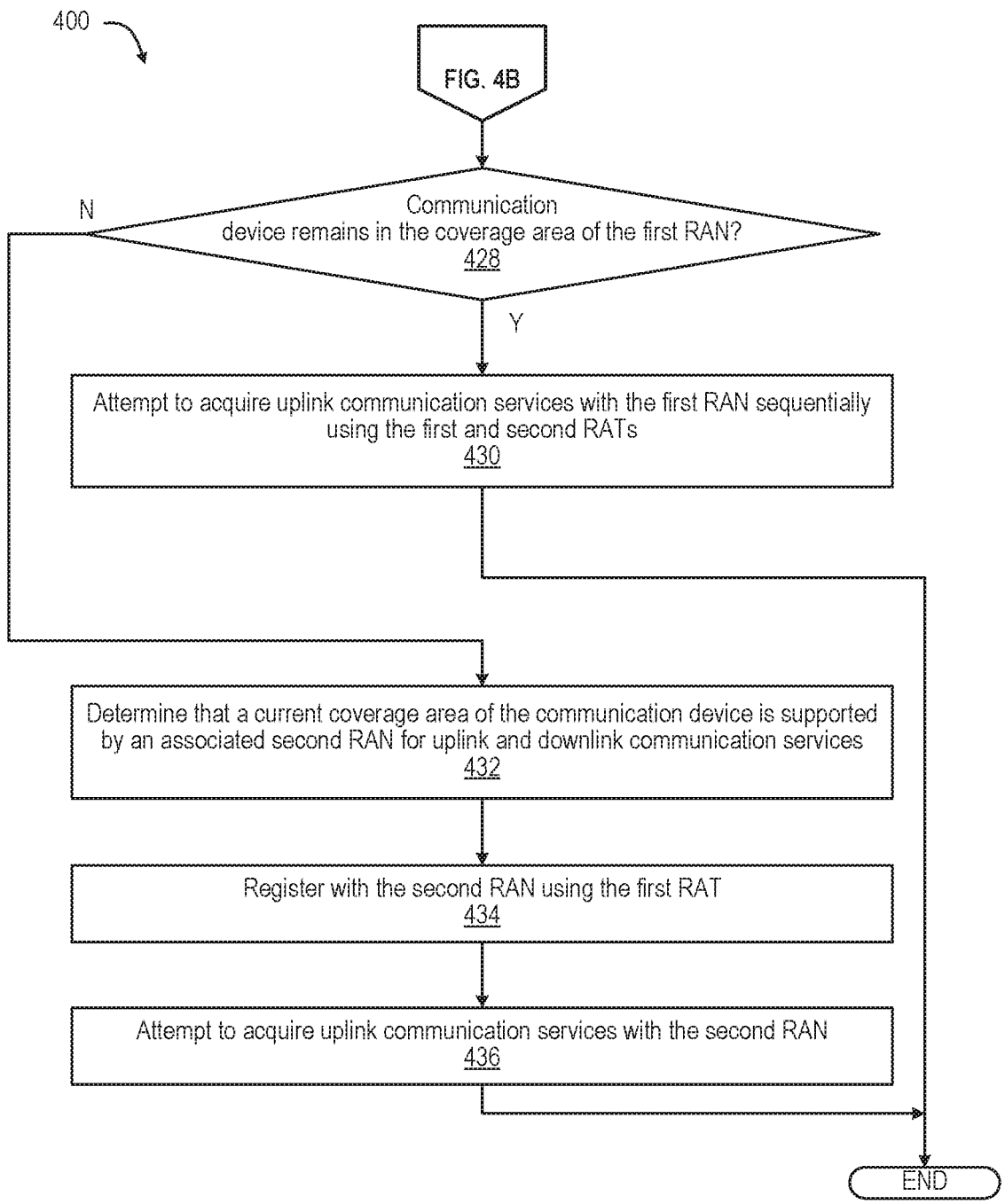

FIGS. 4A-4C depict method 400 for smart system selection to maintain certain downlink communication services in a marginal coverage area and to minimize power consumption by delaying attempts to complete connection to uplink communication services in the marginal coverage area. Learning by SRSM 139 from past successes and failures enables the smart system selection. With initial reference to FIG. 4A, method 400 includes registering for uplink and downlink communication services with a first radio access network (RAN) by a radio frequency (RF) transceiver of communication device 100 (FIG. 1) using a first radio access technology (RAT) (block 402). Method 400 includes determining: (i) transmit communication quality of a first uplink with the first RAN using the first RAT; and (ii) receive communication quality of a first downlink with the first RAN using the first RAT (block 404).

In decision block 406, a controller of the communication device determines, whether the receive communication quality of the first downlink with the first RAN using the first RAT satisfies a first receive threshold quality for downlink communication services. In response to determining that the receive communication quality does not satisfy the first receive threshold quality, method 400 includes determining that communication device is no longer registered on the first RAN using the first RAT (block 408). Method 400 includes registering with the first RAN using the second RAT (block 410). Method 400 includes attempting to acquire uplink communication services with the first RAN (block 412). Then method 400 ends. In response to determining that the receive communication quality satisfies the first receive threshold quality, method 400 includes determining at decision block 414 whether the transmit communication quality of the first downlink with the first RAN using the first RAT satisfies a first transmit threshold quality for uplink communication services. In response to determining that the transmit communication quality satisfies the first transmit threshold quality, method 400 ends.

Continuing in FIG. 4B, in response to determining that the transmit communication quality fails to satisfy the first transmit threshold quality, method 400 includes determining, in decision block 416, whether communication services can be successfully obtained with the first RAN using the second RAT based on the communication information in the memory. In response to determining that communication services can be successfully obtained using the second RAT based on the communication information, method 400 includes registering with the first RAN using the second RAT (block 418). Method 400 includes attempting to acquire uplink communication services with the first RAN using the second RAT (block 420). Then method 400 ends.

In response to determining that communication services cannot be successfully obtained with the first RAN using the second RAT, method 400 includes monitoring the first downlink with the first RAN using the first RAT to receive any mobile terminated (MT) calls (block 422). Method 400 includes delaying, for a preset period of time based on a delay timer, any attempt, using either one of the first and second RATs, to establish uplink communication (block 424). A determination is made in decision block 426 whether the delay timer has expired, indicating that a preset period of time has elapsed. In response to determining that the delay timer has not expired, method 400 returns to block 424. In response to determining that the preset period of time has elapsed, method 400 includes determining, in decision block 428, whether the communication device remains in the coverage area of the first RAN. In response to determining that the communication device remains in the coverage area of the first RAN, method 400 includes attempting to acquire uplink communication services with the first RAN sequentially using the first and second RATs (block 430). Then method 400 ends. In response to determining that the communication device does not remain in the coverage area of the first RAN, method 400 includes determining that a current coverage area of the communication device is supported by an associated second RAN for uplink and downlink communication services (block 432). Method 400 includes registering with the second RAN using the first RAT (block 434). Method 400 includes attempting to acquire uplink communication services with the second RAN (block 436). Then method 400 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
a radio frequency (RF) front end that transmits an uplink and receives a downlink in a selected one of: (i) a first radio access technology (RAT); and (ii) a second RAT;
a memory containing: (i) a smart RAT selection module (SRSM) that mitigates power consumption and communication connectivity lapses in a marginal coverage area; and (ii) information of past communication success and failure with at least a first radio access network (RAN) using the first and second RATs;
a controller communicatively coupled to the RF front end and the memory and which executes the SRSM to enable the communication device to:
in response to determining that both: (i) transmit communication quality of a first uplink with the RAN using the first RAT fails to satisfy a first transmit threshold quality for remaining registered with the first RAN to complete uplink communication services; and (ii) receive communication quality of a first downlink with the first RAN using the first RAT satisfies a first receive threshold quality for remaining registered with the first RAN to complete downlink communication services:
determine, while being registered to the first RAN and based on the information, whether communication services can be successfully obtained using the second RAT; and
in response to determining that communication services cannot be successfully obtained using the second RAT:
monitor the first downlink with the first RAN using the first RAT to receive any mobile terminated (MT) calls; and
delay, for a preset period of time, any attempt to establish uplink communication using one of the first and second RATs that are expected to be unsuccessful in the marginal coverage area.

2. The communication device of claim 1, wherein the controller enables the communication device to:
in response to determining, based on the information, that communication services can be successfully obtained with the first RAN using the second RAT:
register with the first RAN using the second RAT; and
attempt to acquire uplink communication services with the first RAN using the second RAT; and
in response to determining, based on the information, that communication services cannot be successfully obtained with the first RAN using the second RAT:
initiate a timer to track the preset period of time during which to remain registered with the first RAN using the first RAT; and
in response to determining that the preset period of time has elapsed, determining whether the communication device remains in the coverage area of the first RAN;
in response to determining that the communication device remains in the coverage area of the first RAN, attempt to acquire uplink communication services with the first RAN; and
in response to determining that the communication device is no longer in the coverage area of the first RAN:
determine a current coverage area of the communication device and an associated second RAN for uplink and downlink communication services;
register with the second RAN using the first RAT; and
attempt to acquire uplink communication services with the second RAN.

3. The communication device of claim 1, wherein:
the second RAT is a prior generation RAT having a lower communication capacity than the first RAT;
the information in memory further includes: (i) a first RAT stack; and (ii) a second RAT stack;
the RF front end comprises:
a transmitter to transmit the uplink to the RAN;
a receiver to receive a downlink from the RAN in the selected one of the first and second RATs;
a communication module that encodes uplink baseband data from a respective one of the first and second RAT stacks in a corresponding one of the first and second RATs;
a radio frequency (RF) modem that modulates the encoded uplink baseband data for uplink transmission by the transmitter and that demodulates an encoded downlink transmission received by the receiver into encoded downlink baseband data, wherein the communication module decodes the encoded downlink baseband data to downlink baseband data provided to the respective one of the first and second RAT stacks.

4. The communication device of claim 1, further comprising a location services component that provides a current geographic location of the communication device; and
wherein the controller enables the communication device to:
generate the information by associating success and failure of communication services with at least the first RAN at respective current geographic locations of the communication device; and
determine, based at least in part on a current geographic location of the communication device, whether communication services can be successfully obtained using the second RAT with the first RAN.

5. The communication device of claim 4, wherein, to associate success and failure of communication services with at least the first RAN, the controller enables the communication device to:
monitor, for each RAN and RAT, communication performance data comprising one or more of: (i) signal parameter information; (ii) RAT runtime estimated access rate; (iii) reverse access success rate; (iv) random access channel (RACH) success rate; (v) transmit and receive statistical data; and (vi) contextual information including moving speed of the communication device; and
update the information contained in the memory with the communication performance data.

6. The communication device of claim 5, wherein:
the memory contains a priority roaming list; and
the controller enables the communication device to prioritize RANs for selection and re-selection using the priority roaming list based at least in part on the information during a selected one of: (i) updating the priority roaming list; and (ii) registering with a selected RAN.

7. A method comprising:
registering for uplink and downlink communication services with a first radio access network (RAN) by a radio frequency (RF) transceiver of a communication device using a first radio access technology (RAT); and
in response to determining, based on the information and by a controller of the communication device, that both: (i) transmit communication quality of a first uplink with the first RAN using the first RAT fails to satisfy a first transmit threshold quality for remaining registered to complete uplink communication services; and (ii) receive communication quality of a first downlink with the first RAN using the first RAT satisfies a first receive threshold quality for remaining registered with the first RAN for communication services to complete downlink communication services:
while being registered to the first RAN, determining based on information contained in a memory of the communication device of past communication success and failure with at least the first RAN using the first and second RATs, whether communication services can be successfully obtained with the first RAN using a second RAT; and
in response to determining that communication services cannot be successfully obtained with the first RAN using the second RAT:
monitoring the first downlink with the first RAN using the first RAT to receive any mobile terminated (MT) calls; and
delaying for a preset period of time any attempt to establish uplink communication using one of the first and second RATs that are expected to be unsuccessful in the marginal coverage area.

8. The method of claim 7, further comprising:
in response to determining that communication services can be successfully obtained using the second RAT based on the information:
registering with the first RAN using the second RAT; and
attempting to acquire uplink communication services with the first RAN; and in response to determining that communication services cannot be successfully obtained with the first RAN using the second RAT based on the information:
remaining registered with the first RAN using the first RAT for at least a preset period of time; and
in response to determining that the preset period of time has elapsed, determining whether the communication device remains in the coverage area of the first RAN;
in response to determining that the communication device remains in the coverage area of the first RAN, attempting to acquire uplink communication services with the first RAN; and
in response to determining that the communication device does not remain in the coverage area of the first RAN:
determining a current coverage area of the communication device that is supported by an associated second RAN for uplink and downlink communication services;
registering with the second RAN using the first RAT; and
attempting to acquire uplink communication services with the second RAN.

9. The method of claim 7, further comprising:
encoding baseband data from, and decoding baseband data to, a respective one of a first and second RAT stack in the memory in a selected one of the first and second RATs by a communication module of the RF transceiver; and
modulating the encoded baseband data for uplink transmission by a transmitter of the RF transceiver to the selected RAN; and
demodulating a downlink transmission received by a receiver of the RF transceiver into decoded baseband data, wherein the second RAT is a prior generation RAT having a lower communication capacity than the first RAT.

10. The method of claim 7, further comprising:
determining a current geographic location of the communication device;
generating the information by associating success and failure of communication services with at least the first RAN at respective current geographic locations of the communication device to generate the information contained in the memory; and
determining, based at least in part on a current geographic location of the communication device, whether communication services can be successfully obtained using the second RAT with the first RAN.

11. The method of claim 10, wherein associating success and failure of communication services with at least the first RAN comprises:
monitoring, for each RAN and RAT, communication performance data comprising one or more of: (i) signal parameter information; (ii) RAT runtime estimated access rate; (iii) reverse access success rate; (iv) random access channel (RACH) success rate; (v) transmit and receive statistical data; and (vi) contextual information including moving speed of the communication device; and
updating the information contained in the memory with the communication performance data.

12. The method of claim 10, further comprising prioritizing RANs for selection and re-selection in registration using a priority roaming list based at least in part on the information contained in the memory during a selected one of: (i) updating the priority roaming list; and (ii) registering with a selected RAN.

13. A computer program product comprising:
a computer readable storage device; and
program code on the computer readable storage device that when executed by a processor associated with a communication device having a controller and a radio frequency (RF) transceiver, the program code enables the communication device to provide the functionality of:
registering, by a controller of the communication device, for uplink and downlink communication services with a first radio access network (RAN) by a radio frequency (RF) transceiver of a communication device using a first radio access technology (RAT); and
in response to determining, based on the information and by a controller of the communication device, that both: (i) transmit communication quality of a first uplink with the first RAN using the first RAT fails to satisfy a first transmit threshold quality for remaining registered to complete uplink communication services; and (ii) receive communication quality of a first downlink with the first RAN using the first RAT satisfies a first receive threshold quality for remaining registered with the first RAN for communication services to complete downlink communication services:
while being registered to the first RAN, determining based on information contained in a memory of the communication device of past communication success and failure with at least the first RAN using the first and second RATs, whether communication services can be successfully obtained with the first RAN using a second RAT; and
in response to determining that communication services cannot be successfully obtained with the first RAN using the second RAT:
monitoring the first downlink with the first RAN using the first RAT to receive any mobile terminated (MT) calls; and
delaying for a preset period of time any attempt to establish uplink communication using one of the first and second RATs that are expected to be unsuccessful in the marginal coverage area.

14. The computer program product of claim 13, wherein the program code enables the communication device to provide the functionality of:
in response to determining that communication services can be successfully obtained using the second RAT based on the information:
registering, by the controller, with the first RAN using the second RAT; and
attempting to acquire uplink communication services with the first RAN; and
in response to determining that communication services cannot be successfully obtained with the first RAN using the second RAT based on the information:
remaining registered with the first RAN using the first RAT for at least a preset period of time; and
in response to determining that the preset period of time has elapsed, determining whether the communication device remains in the coverage area of the first RAN;
in response to determining that the communication device remains in the coverage area of the first RAN, attempting to acquire uplink communication services with the first RAN; and in response to determining that the communication device does not remain in the coverage area of the first RAN:

determining a current coverage area of the communication device that is supported by an associated second RAN for uplink and downlink communication services;

registering with the second RAN using the first RAT; and attempting to acquire uplink communication services with the second RAN.

15. The computer program product of claim 14, wherein the program code enables the communication device to provide the functionality of:

encoding baseband data from, and decoding baseband data to, a respective one of a first and second RAT stack in the memory in a selected one of the first and second RATs by a communication module of the RF transceiver; and modulating the encoded baseband data for uplink transmission by a transmitter of the RF transceiver to the selected RAN; and demodulating a downlink transmission received by a receiver of the RF transceiver into decoded baseband data, wherein the second RAT is a prior generation RAT having a lower communication capacity than the first RAT.

16. The computer program product of claim 13, wherein the program code enables the communication device to provide the functionality of:

determining a current geographic location of the communication device;

generating the information by associating success and failure of communication services with at least the first RAN at respective current geographic locations of the communication device to generate the information contained in the memory; and determining, based at least in part on a current geographic location of the communication device, whether communication services can be successfully obtained using the second RAT with the first RAN.

17. The computer program product of claim 15, wherein, to associate success and failure of communication services with at least the first RAN, the program code enables the communication device to provide the functionality of:

monitoring, for each RAN and RAT, communication performance data comprising one or more of: (i) signal parameter information; (ii) RAT runtime estimated access rate; (iii) reverse access success rate; (iv) random access channel (RACH) success rate; (v) transmit and receive statistical data; and (vi) contextual information including moving speed of the communication device; and updating the information contained in the memory with the communication performance data.

18. The computer program product of claim 16, wherein the program code enables the communication device to provide the functionality of prioritizing RANs for selection and re-selection in registration using a priority roaming list based at least in part on the information contained in the memory during a selected one of: (i) updating the priority roaming list; and (ii) registering with a selected RAN.

* * * * *